Patented July 28, 1953

2,647,143

UNITED STATES PATENT OFFICE 2,647,143

MANUFACTURE OF PERCHLOROMETHYL MERCAPTAN

Harold M. Pitt, Torrance, and Wilburn Boggs, Redondo Beach, Calif., assignors to Stauffer Chemical Company, a corporation of California No Drawing. Application December 6, 1951, Serial No. 260,344

2 Claims. (Cl. 260—543)

This invention relates to the production of perchloromethyl mercaptan and particularly to a process for the refining or purification of the crude material.

Perchloromethyl mercaptan is made by reacting chlorine and carbon disulfide in the presence of a suitable catalyst such as iodine and one can refer to Helfrich, Journal of American Chemical Society (1921), 43, 591–594; Gilman, Organic Synthesis, vol. 1, 2nd ed. (1944) pages 506, et seq., or the War Gases, Sartori, (1939), 21, for suitable methods of preparation. The resulting product contains sulfur dichloride, $SCl_2$, and sulfur monochloride, $S_2Cl_2$. The crude material resulting from the reaction of carbon bisulfide and chlorine is distilled to separate unreacted carbon disulfide and sulfur dichloride; the sulfur monochloride has a boiling point so close to that of perchloromethyl mercaptan that its separation by distillation is impractical and the usual method of refining the material has been to steam distill the crude product (see Gilman, supra). This is troublesome and far from satisfactory, the product containing various sulfurchlorine complexes and not being of high purity.

We have found that by subjecting the crude material simultaneously to mild oxidizing conditions and chlorination, the sulfur monochloride can be converted to sulfuric acid and hydrochloric acid while the complexes present are oxidized and decomposed into water soluble materials. Thus, we have found that by agitating a mixture of the crude material and water acidified to a pH below about 4.5, preferably between 1 and 3, while introducing a small amount of chlorine to oxidize the sulfur monochloride, the complexes present break up, the sulfur monochloride is converted to sulfuric acid and hydrochloric acid, and the resulting perchloromethyl mercaptan, upon separation of the aqueous phase, is substantially pure. The process can be practiced on the crude material resulting from the chlorination of carbon disulfide. However, it is preferable to remove as much sulfur chloride as is possible by distillation to reduce the consumption of chlorine.

To illustrate the practice of the present invention, the following is set forth by way of example:

1.68 pounds carbon disulfide (10 gr. mols) and 3 grs. of iodine were placed in a two liter flask immersed in a cooling bath. Chlorine was then added at a rate sufficient to maintain the reaction mix at about 20° C.; the actual temperature range was 17°–25° C. After five hours, 84% of the theoretical chlorine for the reaction

had been added. The mixture was then distilled at atmospheric pressure, the overhead being $SCl_2$, $CS_2$ and a little $S_2Cl_2$. The bottoms were cooled, saturated with $Cl_2$ to convert most of the sulfur monochloride to sulfur dichloride and allowed to stand about 45 minutes. Upon redistillation, 75 grs. of additional $SCl_2$ was recovered; the further chlorination was not effective in removing all of the sulfur chlorides. A little loss resulted from carryover due to the excess chlorine. The bottoms, which had been heated to 140° C. during this volatilization of sulfur chloride, were then cooled. At this point, the bottoms weighed 1415 grams and were highly colored.

The crude material was then purified in accordance with this invention. The bottoms were covered with about one-fifth of their volume of a mixture of concentrated hydrochloric acid and water (1:1), having a pH below 1.0. Chlorine was then bubbled into the mixture, the mass being stirred vigorously, until the mass became light yellow, the color of sulfur chloride free of perchloromethyl mercaptan. This took about five minutes and about 10–20 grs. of chlorine. The perchloromethyl mercaptan was then separated from the water layer and dried over calcium chloride. At this point the material was essentially pure but was then distilled under vacuum to obtain a product essentially free of complexes, $SCl_2$ and $S_2Cl_2$. The end point for chlorine addition can also be determined by ascertaining when free chlorine appears in the water layer, indicating that chlorine is no longer being exhausted by oxidation of the sulfur chloride.

The saturation with chlorine after the first distillation is to convert the residual sulfur monochloride to sulfur dichloride for subsequent removal by distillation. It is not necessary to follow this procedure and in some plant practice it may be more economical to go directly from the first distillation and cooling to the water treatment.

The initial acidity of the water mixed with the bottoms is not of too great importance because the oxidation of the sulfur monochloride produces sufficient acid to ensure a highly acidic aqueous phase. It is advisable, however, to start with a distinctly acidic solution so that the sulfur monochloride does not hydrolyze faster than it is oxidized. This hydrolysis liberates free sulfur which, if produced in significant amounts, makes a steam distillation instead of a low vacuum distillation necessary. The quantity of water em-

We claim:

1. A process for purifying crude perchloromethyl mercaptan containing sulfur chloride and complexes resulting from reaction of chlorine and carbon disulfide during manufacture of perchloromethyl mercaptan, comprising agitating the crude perchloromethyl mercaptan with an aqueous phase acidified to a pH below 4.5 while introducing chlorine to react with the sulfur chloride and form sulfuric acid and hydrochloric acid and to oxidize the complexes present and form materials soluble in the aqueous phase, and separating the perchloromethyl mercaptan from the aqueous phase.

2. A process for purifying crude perchloromethyl mercaptan containing sulfur chloride and complexes resulting from reaction of chlorine and carbon disulfide during manufacture of perchloromethyl mercaptan, comprising agitating the crude perchloromethyl mercaptan with an aqueous phase acidified to a pH below 4.5 while introducing chlorine to react with the sulfur chloride and form sulfuric acid and hydrochloric acid and to oxidize the complexes and form materials soluble in the aqueous phase, continuing the introduction of chlorine until free chlorine is present in the aqueous phase and separating the perchloromethyl mercaptan from the aqueous phase.

HAROLD M. PITT.
WILBURN BOGGS.

References Cited in the file of this patent

UNITED STATES PATENTS

| Number | Name | Date |
| --- | --- | --- |
| 2,362,057 | Edwards | Nov. 7, 1944 |
| 2,545,285 | Kamlet | Mar. 13, 1951 |
| 2,575,290 | Ohsol et al. | Nov. 13, 1951 |

FOREIGN PATENTS

| Number | Country | Date |
| --- | --- | --- |
| 323,727 | Italy | Jan. 4, 1935 |

OTHER REFERENCES

Mellon: "Comprehensive Treatise on Inorganic and Theoretical Chemistry," vol. 10 (1930), pp. 632–3, 638, 646.

Helfrich: J. A. Chem. Soc., vol. 43, pp. 591–594 (1921).

Schechter et al.: J. Chem. Soc. (London), vol. 63, pp. 1764–5 (1941).

Rathke: Annalen, vol. 167, pp. 195–211 (1873).

Klason: Berichte, vol. 20, pp. 2376–2385 (1887).

Rathke: Berichte, vol. 3, pp. 858–862 (1870).